United States Patent Office 3,204,970
Patented Sept. 7, 1965

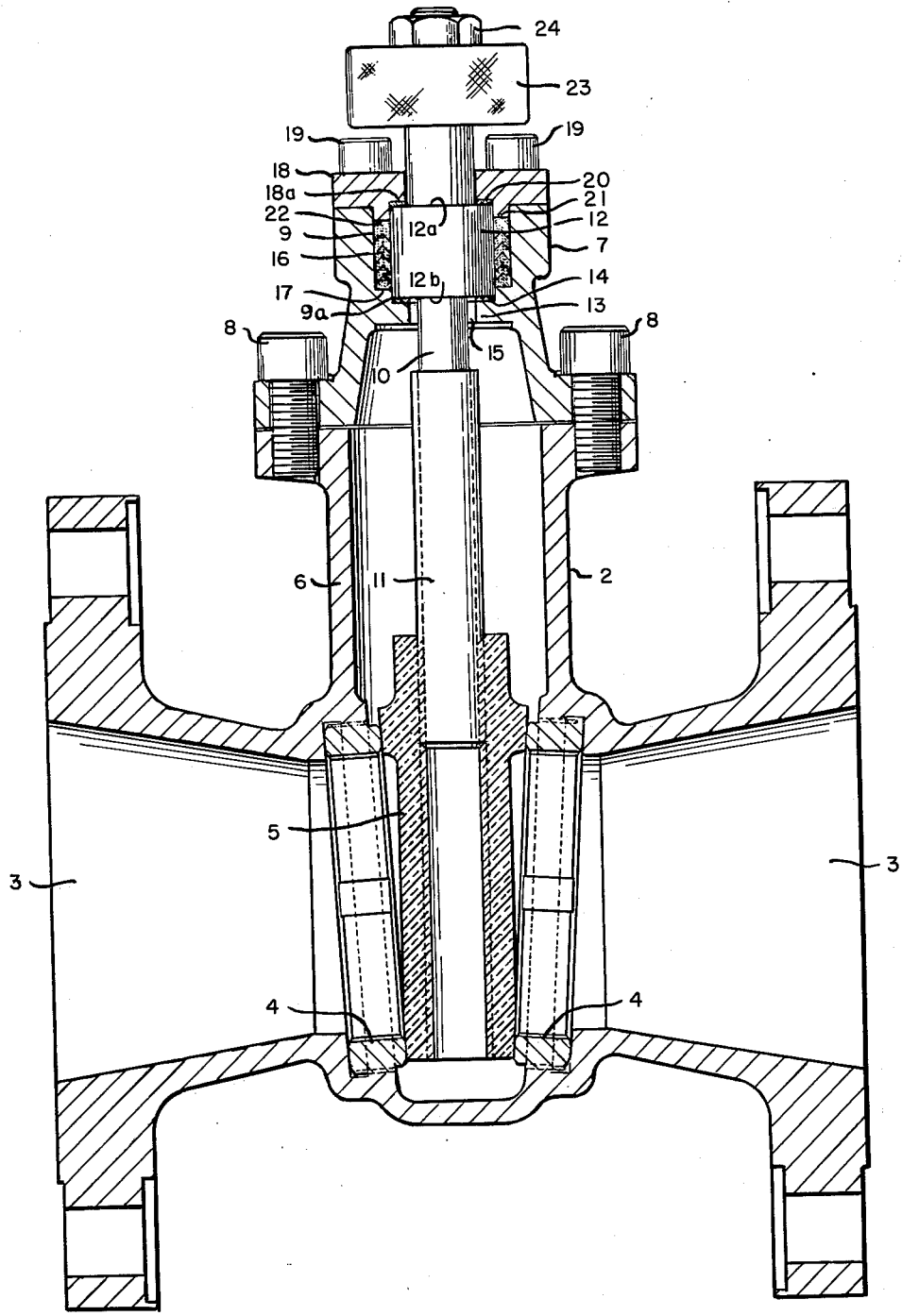

3,204,970
SEAL FOR A VALVE OPERATOR
Scott R. Dickinson, Glenshaw, Pa., assignor to Miller Printing Machinery Co., Pittsburgh, Pa., a corporation of Pennsylvania
Filed Nov. 30, 1962, Ser. No. 241,324
3 Claims. (Cl. 277—105)

This invention relates to valves and particularly to a seal for a valve operator and has to do particularly with packed valves and makes novel provision for maintaining the valve packing in place while positively preventing overcompression of the packing. The invention further relates to a valve having a combination thrust collar and packing gland whereby the valve structure is greatly simplified and its cost reduced while at the same time insuring against overcompression of the packing.

For purposes of explanation and illustration the invention will be described as embodied in a valve of the type having a rectilinearly movable valve element which is moved between operative position closing the valve to inoperative position in which the valve is open by a threaded stem which turns in place but does not move axially. Turning of the stem to move the valve element imposes an endwise thrust on the stem, which endwise thrust is absorbed by the valve casing. The stem may be provided with an enlargement disposed in an outwardly open chamber in the casing and a thrust collar may be applied to the casing to close the outer end of the chamber. Inward thrust of the enlargement is absorbed by the portion of the casing inwardly of the enlargement and outward thrust of the enlargement is absorbed by the thrust collar which is bolted or otherwise fastened to the casing so as in effect to form an integral part of the casing.

Packing may be disposed about the enlargement of the stem so that the valve is sealed against leakage in the chamber in which the enlargement of the stem is disposed. The thrust collar has as an integral part thereof a packing gland which maintains the packing in place, but due to the fact that inward movement of the thrust collar with which the packing gland is integral is limited by direct face to face engagement of the thrust collar with the casing the pressure to which the packing is subjected is thus positively limited and it is impossible to overcompress the packing. This is very important as in packed valves one of the great difficulties is insuring adequate tightness of the seal through compression of the packing while at the same time avoiding overcompression of the packing. Overcompression may have serious consequences as overcompressed packing may to some extent lose its sealing properties; moreover, overcompression of packing imposes high frictional resistance to turning of the packed valve element requiring the application of great force to open and close the valve. It is very difficult to impose on the packing of a packed valve exactly the correct degree of pressure to insure proper packing of the valve while avoiding overcompression of the packing. This problem is completely solved by my invention as the packing gland which forms an integral part of the thrust collar always moves to a precisely predetermined position when the thrust collar is applied to the valve casing and a preformed packing of predetermined size may be employed so that the degree of its compression is always precisely predetermined to the end that the valve is always properly sealed while overcompression of the packing is avoided.

I provide a seal for a valve operator comprising a casing, a stem rotatably mounted on and extending into said casing, the stem having an enlargement, the casing having an outwardly open chamber through which the stem passes and in which the enlargement is disposed, the chamber having a reduced portion at its bottom in which the lower portion of the enlargement fits and having an inward passage receiving the portion of the stem inwardly of the enlargement, packing of V type with the apices of the V's disposed upwardly surrounding the enlargement, above said reduced portion of the chamber, the packing being disposed between and in contact with the outer periphery of the enlargement and the inner wall of the chamber to seal the enlargement to the chamber and inhibit leakage therebetween, a thrust collar outwardly closing the chamber and absorbing the outward thrust of the enlargement when the stem is rotated, the thrust collar having integral therewith a packing gland maintaining the packing in place, and means for fastening the thrust collar to the casing, the engagement of the thrust collar with the casing limiting the inward movement of the packing gland and thus protecting the packing against overcompression. The enlargement on the stem is preferably a cylindrical enlargement with a flat face at each end perpendicular to the axis of the cylinder and the inner flat face of the enlargement preferably bears against the annular portion of the chamber surrounding the inward passage while the outer flat face of the enlargement bears against the thrust collar. The packing gland is preferably an annular packing gland which enters the chamber, surrounds the outer end of the enlargement on the stem and engages the outer end face of the packing.

Other details, objects and advantages of the invention will become apparent as the following description of a present preferred embodiment thereof proceeds.

In the accompanying drawing I have illustrated a present preferred embodiment of the invention in which the figure is a cross-sectional view axially through a valve and also through the center line of the fluid passage through the valve illustrating my novel combination thrust collar and packing gland and its cooperative relationship with the other elements of the valve.

The valve casing comprises a main housing 2 through which a fluid passage 3 extends and having inclined seat members 4. The valve element is shown at 5 and is mounted for vertical movement between an operative position closing the fluid passage 3 through tight engagement with the seats 4 as shown in the drawing and an inoperative position in which the fluid passage is open, the valve element 5 being raised into the neck portion 6 of the housing 2 when in operative position.

A bonnet 7 is applied to the housing 2, being fastened thereto by bolts 8, suitable sealing means being provided between the housing and bonnet as is customary in the art. The housing 2 and bonnet 7 together form the valve casing. The bonnet has a cylindrical chamber 9 which is open outwardly and upwardly thereof.

The valve element 5 is raised and lowered by means of a stem 10 which has a threaded portion 11 which is threaded into the valve element 5 so that when the stem 10 is turned in place the valve element moves axially of the stem. The stem 10 has an integral cylindrical enlargement 12 with flat top and bottom faces 12a and 12b respectively disposed at right angles to the axis of the stem 10, the enlargement 12 being disposed in the cylindrical chamber 9 of the bonnet 7. The chamber 9 has a reduced portion 9a at its bottom in which the lower portion of the enlargement 12 fits as shown in the drawing. The downward thrust of the enlargement 12 when the valve element 5 is being moved upwardly is taken by the portion 13 of the bonnet having a flat upper face through a flat thrust washer 14. The bonnet has an inward passage 15 receiving the portion of the stem inwardly of the enlargement 12.

Packing 16 which may be of any suitable type but is preferably preformed to predetermined dimension is disposed about the enlargement 12 of the stem 10 within the chamber 9 and at its bottom seats on a ledge 17 near the bottom of the chamber but above the reduced portion 9a. A thrust collar 18 is applied to the bonnet 7 and fastened in place by bolts 19. The thrust collar 18 has a flat annular downwardly facing abutment portion 18a which through a flat thrust washer 20 absorbs the upward thrust of the enlargement 12 when the valve element 5 is being moved downwardly from inoperative to operative position in the housing 2 and seated against the opposed valve seats 4 to close the fluid passage 3.

Integral with the thrust collar 18 is an annular packing gland 21 which enters the chamber 9 and surrounds the outer end of the enlarged 12, fitting between the outer end of the enlargement and the outer end of the chamber, and engages the outer face 22 of the packing 16. Since downward movement of the combination thrust collar and packing gland is positively limited by the bonnet 7 the distance in which the packing gland 21 may enter the annular space between the outer periphery of the upper portion of the enlargement 12 and the inner periphery of the upper portion of the chamber 9 is positively limited so that it is impossible to impose on the packing 16 any pressure in excess of the design pressure. Thus by proper design of the packing for a particular style of valve proper and adequate compression of the packing is always assured with equal assurance that the packing will not be overcompressed.

As shown the packing 16 is of V type with the apices of the V's disposed upwardly. Any leakage upwardly past the bottom of the enlargement 12 passes from the reduced portion 9a of the chamber 9 into the portion of the chamber containing the packing at a zone below the packing to as to tend to spread the V's in its upward movement, pressing the lips of the V's against the enlargement 12 and the inner wall of the chamber 9, promoting sealing efficiency of the packing.

Any suitable means providing adequate mechanical advantage may be provided for turning the stem 10. In the drawing a valve operating lever 23 is shown which is applied to the upper end of the stem 10 and maintained in place by a nut 24 threaded to the upper end of the stem. Preferably the portion of the stem to which the lever 23 is applied is noncircular and the lever has an opening therein of conforming shape so that turning of the lever compels turning of the stem therewith. In the drawing the lever extends perpendicular to the plane of the paper.

While I have shown and described a present preferred embodiment of the invention it is to be distinctly understood that the invention is not limited thereto but may be otherwise variously embodied within the scope of the following claims.

I claim:

1. A seal for a valve operator comprising a casing, a stem rotatably mounted on and extending into said casing, the stem having an enlargement, the casing having an outwardly open chamber through which the stem passes and in which the enlargement is disposed, the chamber having a reduced portion at its bottom in which the lower portion of the enlargement fits and having an inward passage receiving the portion of the stem inwardly of the enlargement, packing of V type with the apices of the V's disposed upwardly surrounding the enlargement above said reduced portion of the chamber, the packing being disposed between and in contact with the outer periphery of the enlargement and the inner wall of the chamber to seal the enlargement to the chamber and inhibit leakage therebetween, a thrust collar outwardly closing the chamber and absorbing the outward thrust of the enlargement when the stem is rotated, the thrust collar having integral therewith a packing gland maintaining the packing in place, and means for fastening the thrust collar to the casing, the engagement of the thrust collar with the casing limiting the inward movement of the packing gland and thus protecting the packing against overcompression.

2. A seal for a valve operator comprising a casing, a stem rotatably mounted on and extending into said casing, the stem having a cylindrical enlargement with a flat face at each end perpendicular to the axis of the cylinder, the casing having a cylindrical outwardly open chamber through which the stem passes and in which the enlargement is disposed, the chamber having a reduced portion at its bottom in which the lower portion of the enlargement fits and having an inward passage receiving the portion of the stem inwardly of the enlargement with the inner flat face of the enlargement bearing against the annular portion of the chamber surrounding the inward passage, packing of V type with the apices of the V's disposed upwardly surrounding the cylindrical surface of the enlargement above said reduced portion of the chamber, the packing being disposed between and in contact with the outer periphery of the enlargement and the inner wall of the chamber to seal the enlargement to the chamber and inhibit leakage therebetween, a thrust collar outwardly closing the chamber against which the outer flat face of the enlargement bears to absorb the outward thrust of the enlargement when the stem is rotated, the thrust collar having integral therewith a packing gland maintaining the packing in place, and means for fastening the thrust collar to the casing, the engagement of the thrust collar with the casing limiting the inward movement of the packing gland and thus protecting the packing against overcompression.

3. A seal for a valve operator comprising a casing, a stem rotatably mounted on and extending into said casing, the stem having an enlargement, the casing having an outwardly open chamber through which the stem passes and in which the enlargement is disposed, the chamber having a reduced portion at its bottom in which the lower portion of the enlargement fits and having an inward passage receiving the portion of the stem inwardly of the enlargement, packing of V type with the apices of the V's disposed upwardly surrounding the enlargement above said reduced portion of the chamber, the packing being disposed between and in contact with the outer periphery of the enlargement and the inner wall of the chamber to seal the enlargement to the chamber and inhibit leakage therebetween, a thrust collar outwardly closing the chamber and resisting the outward thrust of the enlargement when the stem is rotated, the thrust collar having integral therewith an annular packing gland entering the chamber, surrounding the outer end of the enlargement and engaging the outer end face of the packing maintaining the packing in place, and means for fastening the thrust collar to the casing, the engagement of the thrust collar with the casing limiting the inward movement of the packing gland and thus protecting the packing against overcompression.

References Cited by the Examiner

UNITED STATES PATENTS

| 2,342,276 | 2/44 | Hehemann | 251—266 X |
| 2,711,333 | 6/55 | Rodgers | 277—105 X |
| 2,757,897 | 8/56 | Cline | 251—266 |
| 2,817,545 | 12/57 | Uhler | 251—214 X |

FOREIGN PATENTS

| 1,167,341 | 11/58 | France. |
| 1,027,029 | 3/58 | Germany. |
| 1,116,002 | 10/61 | Germany. |
| 450,387 | 7/36 | Great Britain. |

ISADOR WEIL, *Primary Examiner.*

UNITED STATES PATENT OFFICE
CERTIFICATE OF CORRECTION

Patent No. 3,204,970                                            September 7, 1965

Scott R. Dickinson

It is hereby certified that error appears in the above numbered patent requiring correction and that the said Letters Patent should read as corrected below.

Column 2, line 48, for "operative" read -- inoperative --; column 3, line 1, for "dimension" read -- dimensions --; line 15, for "enlarged" read -- enlargement --.

Signed and sealed this 12th day of April 1966.

(SEAL)
Attest:

ERNEST W. SWIDER                                          EDWARD J. BRENNER
Attesting Officer                                               Commissioner of Patents